United States Patent
Li et al.

(10) Patent No.: US 9,755,261 B2
(45) Date of Patent: Sep. 5, 2017

(54) RECOVERY OF METAL COMPONENTS FROM SULFIDE MINERAL TAILINGS BY MICROBIAL FUEL CELL

(71) Applicants: Xiufen Li, Wuxi (CN); Pengfei Nie, Wuxi (CN); Yueping Ren, Wuxi (CN); Xinhua Wang, Wuxi (CN)

(72) Inventors: Xiufen Li, Wuxi (CN); Pengfei Nie, Wuxi (CN); Yueping Ren, Wuxi (CN); Xinhua Wang, Wuxi (CN)

(73) Assignee: Jiangnan University, Wuxi, Jiangsu (CN)

( * ) Notice: Subject to any disclaimer, the term of this patent is extended or adjusted under 35 U.S.C. 154(b) by 56 days.

(21) Appl. No.: 14/843,303

(22) Filed: Sep. 2, 2015

(65) Prior Publication Data
US 2017/0062858 A1 Mar. 2, 2017

(51) Int. Cl.
*H01M 8/16* (2006.01)
(52) U.S. Cl.
CPC ..................... *H01M 8/16* (2013.01)
(58) Field of Classification Search
CPC ....................................................... H01M 8/16
See application file for complete search history.

(56) References Cited

U.S. PATENT DOCUMENTS

2007/0042482 A1* 2/2007 Ohata ..................... C22B 3/18
435/168

OTHER PUBLICATIONS

Heijne et al. (Environ. Sci. Technol. 2007, 41, 4130-4134).*
Malki et al. (Applied and Environmental Microbiology, Jul. 2008, vol. 74, No. 14, p. 4472-4476).*

* cited by examiner

*Primary Examiner* — Olatunji Godo
(74) *Attorney, Agent, or Firm* — Lili Chen

(57) ABSTRACT

The present invention provides a novel method that recovers metal components from sulfide mineral tailings by Microbial Fuel Cell. The traditional bio-hydrometallurgy reaction is split to one oxidization reaction taking place in the anode chamber and one reduction reaction taking place in the cathode chamber. $H^+$ generated during the oxidization reaction is continually transferred to cathode chamber through proton exchange membrane and reacted with $O_2$ to generate $H_2O$, which not only increases the reaction rate in anode chamber but also decreases equipment corrosion caused by excessive $H^+$. The method of the present invention, recovering metals as well as electronic power, is environment-friendly.

5 Claims, 1 Drawing Sheet

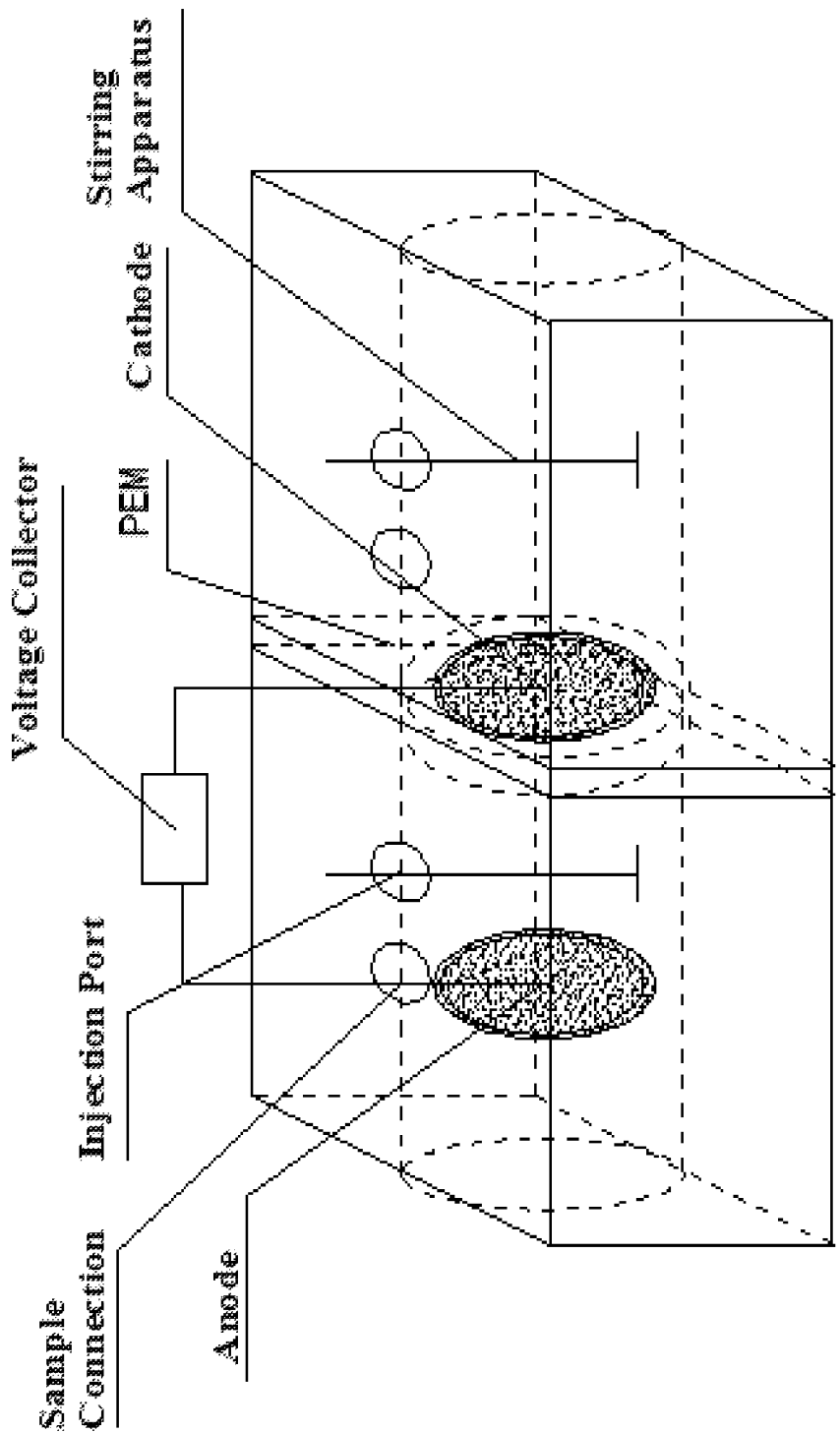

RECOVERY OF METAL COMPONENTS FROM SULFIDE MINERAL TAILINGS BY MICROBIAL FUEL CELL

BACKGROUND OF THE INVENTION

Field of the Invention

The present invention relates to the field of solid waste reutilization. In particular, it relates to recovery of metal components from sulfide mineral tailings by Microbial Fuel Cell.

Description of the Related Art

With the increasing demand of mineral resources, the amount of high-grade mineral resources that are easy for ore dressing are decreasing sharply. People have to recover valuable metal components from sulfide mineral tailings. Traditional metallurgy technologies mainly apply to high-grade minerals and have already made serious impact on environment. Microbial metallurgy that is less costly, highly efficient and environment-friendly has developed rapidly during the past years.

According to different working principles, microbial metallurgy can be classified into microbial leaching, microbial oxidation, microbial adsorption and microbial accumulation. Microbial leaching recovers valuable metal components by releasing metals from sulfide mineral tailings under microbial oxidization or reduction activities to get free metal ions.

Microbial Fuel Cell (MFC) represents one of the emerging pathways for conversion of chemical energy contained in wastes into electrical power. The cathode and the anode chamber of double-chambered MFC are separated by proton exchange membrane. Electrons generated from oxidization reaction happened in anode chamber were transferred from anode to cathode through external circuit. Electron acceptor in cathode chamber then reacted with proton and generated water as well as electrical power. As long as the development of MFC, MFC is going to be a promising pathway for pollution control and biomass energy exploitation.

DETAILED DESCRIPTION

The goal of the present invention is to provide a novel method that recovers metal components from sulfide mineral tailings by Microbial Fuel Cell. The method of the present invention, recovering metals as well as electronic power, is environment-friendly.

The MFC used in the present invention is a double-chambered MFC. The cathode and the anode chamber of double-chambered MFC are separated by a proton exchange membrane. The anode chamber contains sulfide mineral tailings, an electrode and an electricigens culture. The initial pH of the anode chamber is 1.5~2.5 and anaerobic condition is maintained in the anode chamber. The cathode chamber contains a phosphate buffer, an electrode and an aerator. The electrodes in anode and cathode chambers are connected through an external circuit.

Once the MFC begins to work, sulfide mineral tailings in anode chamber start to be oxidized and release free metal ions. $H^+$ generated during the oxidization reaction is transferred to cathode chamber through proton exchange membrane, while electrons are transferred from anode to cathode through an external circuit. Electron acceptor $O_2$ in cathode chamber then react with $H^+$ to generate water as well as electrical power.

In a preferred embodiment, the electrodes in both cathode and anode chamber are made of graphite felt or carbon cloth. Both graphite felt and carbon cloth are cost efficient and has big specific surface area, which makes it easy for microorganisms to attach.

In a preferred embodiment, the anode chamber contains 5~50 g/L sulfide mineral tailings.

In a preferred embodiment, the phosphate buffer in the cathode chamber contains 50 mM phosphate salts (pH 7.0).

In a preferred embodiment, the whole process could be depicted with equations below:

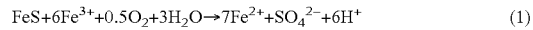  (1)

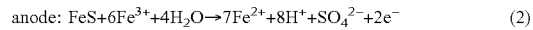  (2)

  (3)

In a preferred embodiment, the whole process could be depicted with equations below:

  (4)

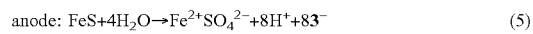  (5)

  (6)

In a preferred embodiment, the electricigens include Sulfur-Oxidizing bacteria and *Acidithiobacillus ferrooxidans*. These two microorganisms cooperated with each other to enhance metallurgy efficiency.

In a preferred embodiment, the electricigens is domesticated and cultured with the medium containing: 0.14~0.16 g/L of $(NH_4)_2SO_4$, 0.04~0.06 g/L of KCl, 0.04~0.06 g/L of $K_2HPO_4$, 0.4~0.6 g/L of $MgSO_4 \cdot 7H_2O$, 0.008~0.012 g/L of $Ca(NO_3)_2$, 8~12 g/L of S, 0.34~0.36 mL/L of trace elements solution and 0.13~0.16 mL/L vitamin solution; pH value of the medium was adjusted to 3.9~4.1 with $H_2SO_4$ (1~10 mol/L). The trace elements solution contains: 0.9~1.1 g/L of nitrilotriacetic acid, 1.4~4.6 g/L of $MgSO_4$, 0.4~0.6 g/L of NaCl, 0.04~0.06 g/L of $FeSO_4 \cdot 7H_2O$, 0.004~0.006 g/L of alum, 0.011~0.013 g/L of $Na_2WO_3 \cdot 2H_2O$, 0.04~0.06 g/L of $C_oCl_2 \cdot 6H_2O$. The vitamin solution contains: 0.018~0.022 g/L of biotin, 0.018~0.022 g/L of folic acid, 0.04~0.06 g/L of p-aminobenzoic acid, 0.04~0.06 g/L of $VB_5$, 0.0008~0.0012 g/L of $VB_{12}$, 0.04~0.06 g/L of $\alpha$-lipoic acid, 0.04~0.06 g/L of riboflavin.

In the present invention, we split the traditional bio-hydrometallurgy reaction into one oxidization reaction taking place in the anode chamber and one reduction reaction taking place in the cathode chamber. By doing so, $H^+$ generated during the oxidization reaction was continually transferred to cathode chamber through proton exchange membrane and reacted with $O_2$ to generate $H_2O$, which not only increases the reaction rate in anode chamber but also decreases equipment corrosion caused by excessive $H^+$.

In the present invention, because $H^+$ and proton generated during the oxidization reaction is continually transferred, reaction rate in anode chamber is greatly increased. Compared with traditional bio-hydrometallurgy, recovery of metal elements increased 14.2~26.4%.

BRIEF DESCRIPTION OF DRAWINGS

FIG. 1. Structure of the double-chamber MFC used in this invention.

EXAMPLES

The following examples are provided for illustration purposes only, are not intended to limit the scope of the invention, which is limited only by the claims.

Materials and Methods

Determination of the Concentration of Iron by Atomic Absorption Spectroscopy

R is defined as iron recovery:

$$R=[m_{Fe}/(m_{pv}*w_{Fe})]*100\%.$$

where $m_{Fe}$ (mg/L) is the concentration of iron in leachate, $m_{pv}$ (mg/L) is the content of FeS in sulfide mineral tailings, $w_{Fe}$ (%) is the mass fraction of iron in FeS.

Example 1

Iron Recovery by Traditional Bio-hydrometallurgy

The electricigens culture and medium were mixed according to volume ratio 1:0.8 and added into a leaching tank with a liquid volume of 28 mL. After that, 25 g/L pyrrhotine tailings were added and pH value of the liquid in leaching tank was adjusted to 2.0 with $H_2SO_4$ solution (5%). The device was performed at 30° C. with 8.62 mg/L dissolved oxygen for 6 days. Iron recovery is 34.50%. No power output was generated.

Example 2

Iron Recovery by Double-chambered MFC

A double-chambered MFC was established. The two chambers were separated by a proton exchange membrane. The electrodes in both cathode and anode chamber were made of graphite felt. The output power was monitored by Voltage Collector.

The volume for anode chamber was 28 mL. The electricigens culture and medium were mixed according to volume ratio 1:0.8 and added into the anode chamber. After that, 50 g/L pyrrhotine tailings were added and pH value of the liquid was adjusted to 2.0 with $H_2SO_4$ solution (5%). Anaerobic condition is maintained in the anode chamber.

28 mL phosphate buffer (50 mM, pH 7.0) were added into the cathode chamber and 8.62 mg/L dissolved oxygen was maintained.

The double-chambered MFC was performed at 30° C. for 6 days. Compared with the traditional bio-hydrometallurgy described in Example 1, iron recovery increased 26.43% and output power was observed with a maximal value of 367.6 mV.

Example 3

Iron Recovery by Double-chambered MFC

A double-chambered MFC was established. The two chambers were separated by a proton exchange membrane. The electrodes in both cathode and anode chamber were made of graphite felt. The output power was monitored by Voltage Collector.

The volume for anode chamber was 28 mL. The electricigens culture and medium were mixed according to volume ratio 1:1 and added into the anode chamber. After that, 25 g/L pyrrhotine tailings were added and pH value of the liquid was adjusted to 2.0 with $H_2SO_4$ solution (5%). Anaerobic condition is maintained in the anode chamber.

28 mL phosphate buffer (50 mM, pH 7.0) were added into the cathode chamber and 8.62 mg/L dissolved oxygen was maintained.

The double-chambered MFC was performed at 30° C. for 6 days. Compared with the traditional bio-hydrometallurgy described in Example 1, iron recovery increased 23.26% and output power was observed with maximal value 259.9 mV.

Example 4

Iron Recovery by Double-chambered MFC

A double-chambered MFC was established. The two chambers were separated by a proton exchange membrane. The electrodes in both cathode and anode chamber were made of graphite felt. The output power was monitored by Voltage Collector.

The volume for anode chamber was 28 mL. The electricigens culture and medium were mixed according to volume ratio 1:1.2 and added into the anode chamber. After that, 12.5 g/L pyrrhotine tailings were added and pH value of the liquid was adjusted to 2.0 with $H_2SO_4$ solution (5%). Anaerobic condition is maintained in the anode chamber.

28 mL phosphate buffer (50 mM, pH 7.0) were added into the cathode chamber and 8.62 mg/L dissolved oxygen was maintained.

The double-chambered MFC was performed at 30° C. for 6 days. Compared with the traditional bio-hydrometallurgy described in Example 1, iron recovery increased 17.98% and output power was observed with maximal value 234.4 mV.

Example 5

Iron Recovery by Double-chambered MFC

A double-chambered MFC was established. The two chambers were separated by a proton exchange membrane. The electrodes in both cathode and anode chamber were made of graphite felt. The output power was monitored by Voltage Collector.

The volume for anode chamber was 28 mL. The electricigens culture and medium were mixed according to volume ratio 1:1 and added into the anode chamber. After that, 25 g/L pyrrhotine tailings were added and pH value of the liquid was adjusted to 1.5 with $H_2SO_4$ solution (5%). Anaerobic condition is maintained in the anode chamber.

28 mL phosphate buffer (50 mM, pH 7.0) were added into the cathode chamber and 8.62 mg/L dissolved oxygen was maintained.

The double-chambered MFC was performed at 30° C. for 6 days. Compared with the traditional bio-hydrometallurgy described in Example 1, iron recovery increased 21.82% and output power was observed with maximal value 276.3 mV.

Example 6

Iron Recovery by Double-chambered MFC

A double-chambered MFC was established. The two chambers were separated by a proton exchange membrane. The electrodes in both cathode and anode chamber were made of graphite felt. The output power was monitored by Voltage Collector.

The volume for anode chamber was 28 mL. The electricigens culture and medium were mixed according to volume ratio 1:1 and added into the anode chamber. After that, 5 g/L pyrrhotine tailings were added and pH value of the liquid was adjusted to 2.5 with $H_2SO_4$ solution (5%). Anaerobic condition is maintained in the anode chamber.

28 mL phosphate buffer (50 mM, pH 7.0) were added into the cathode chamber and 8.62 mg/L dissolved oxygen was maintained.

The double-chambered MFC was performed at 30° C. for 6 days. Compared with the traditional bio-hydrometallurgy described in Example 1, iron recovery increased 14.23% and output power was observed with maximal value 173.6 mV.

Example 7

Iron Recovery by Double-chambered MFC

A double-chambered MFC was established. The two chambers were separated by a proton exchange membrane. The electrodes in both cathode and anode chamber were made of graphite felt. The output power was monitored by Voltage Collector.

The volume for anode chamber was 28 mL. The electricigens culture and medium were mixed according to volume ratio 1:1 and added into the anode chamber. After that, 5 g/L pyrrhotine tailings were added and pH value of the liquid was adjusted to 4.5 with $H_2SO_4$ solution (5%). Anaerobic condition is maintained in the anode chamber.

28 mL phosphate buffer (50 mM, pH 7.0) were added into the cathode chamber and 8.62 mg/L dissolved oxygen was maintained.

The double-chambered MFC was performed at 30° C. for 6 days. Compared with the traditional bio-hydrometallurgy described in Example 1, iron recovery decreased 9.80% and output power was observed with maximal value 133.1 mV.

* * *

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for recovering metal iron from sulfide mineral tailings, comprising adding said sulfide mineral tailings to a Double-chambered Microbial Fuel Cell (MFC) and producing free iron with a high recovering rate, wherein said Double-chambered Microbial Fuel Cell comprises a cathode and an anode chamber separated by a proton exchange membrane, and electrodes in said anode and said cathode chambers connected through an external circuit; wherein said anode chamber contains said sulfide mineral tailings, an electrode and an electricigens culture comprising Sulfur-Oxidizing bacteria and *Acidithiobacillus ferrooxidans*; wherein initial pH of said anode chamber is 1.5~2.5 and anaerobic condition is maintained in said anode chamber; wherein said cathode chamber contains a phosphate buffer, an electrode and an aerator; and wherein the reaction in said Double-chambered MFC is depicted with equations below:

$$FeS+6Fe^{3+}+0.5O_2+3H_2O \rightarrow 7Fe^{2+}+SO_4^{2-}+6H^+$$

anode: $FeS+6Fe^{3+}+4H_2O \rightarrow 7Fe^{2+}+8H^++SO_4^{2-}+2e^-$ cathode: $2.25O_2+9H^++9e^- \rightarrow 4.5H_2O$ or $$FeS+2O_2 \rightarrow Fe^{2+}+SO_4^{2-}$$

anode: $FeS+4H_2O \rightarrow Fe^{2+}+SO_4^{2-}+8H^++8e^-$ cathode: $2O_2+8H^++8e^- \rightarrow 4H_2O$ 2. The method of claim 1, wherein said electrodes in said cathode and said anode chamber are made of graphite felt or carbon cloth.

3. The method of claim 1, wherein said anode chamber contains 5~50 g/L sulfide mineral tailings.

4. The method of claim 1, wherein said phosphate buffer in said cathode chamber contains 50 mM phosphate salt (pH 7.0).

5. A Double-chambered Microbial Fuel Cell device for recovering iron metal from sulfide mineral tailings, comprising a cathode and an anode chamber separated by a proton exchange membrane, and electrodes in said anode and said cathode chamber connected through an external circuit, wherein said anode chamber contains said sulfide mineral tailings, an electrode and an electricigens culture comprising Sulfur-Oxidizing bacteria and *Acidithiobacillus ferrooxidans*; wherein initial pH of said anode chamber is 1.5~2.5 and anaerobic condition is maintained in said anode chamber; wherein said cathode chamber contains a phosphate buffer, an electrode and an aerator; and wherein the reaction in said Double-chambered MFC is depicted with equations below:

$$FeS+6Fe^{3+}+0.5O_2+3H_2O \rightarrow 7Fe^{2+}+SO_4^{2-}+6H^+$$

anode: $FeS+6Fe^{3+}+4H_2O \rightarrow 7Fe^{2+}+8H^++SO_4^{2-}+2e^-$ cathode: $2.25O_2+9H^++9e^- \rightarrow 4.5H_2O$ or $$FeS+2O_2 \rightarrow Fe^{2+}+SO_4^{2-}$$

anode: $FeS+4H_2O \rightarrow Fe^{2+}+SO_4^{2-}+8H^++8e^-$ cathode: $2O_2+8H^++8e^- \rightarrow 4H_2O$

* * * * *